4 Sheets--Sheet 1.
M. G. FARMER.
Electro-Magnectic Telegraphs.
No. 5,181. Reissued Dec. 10, 1872.
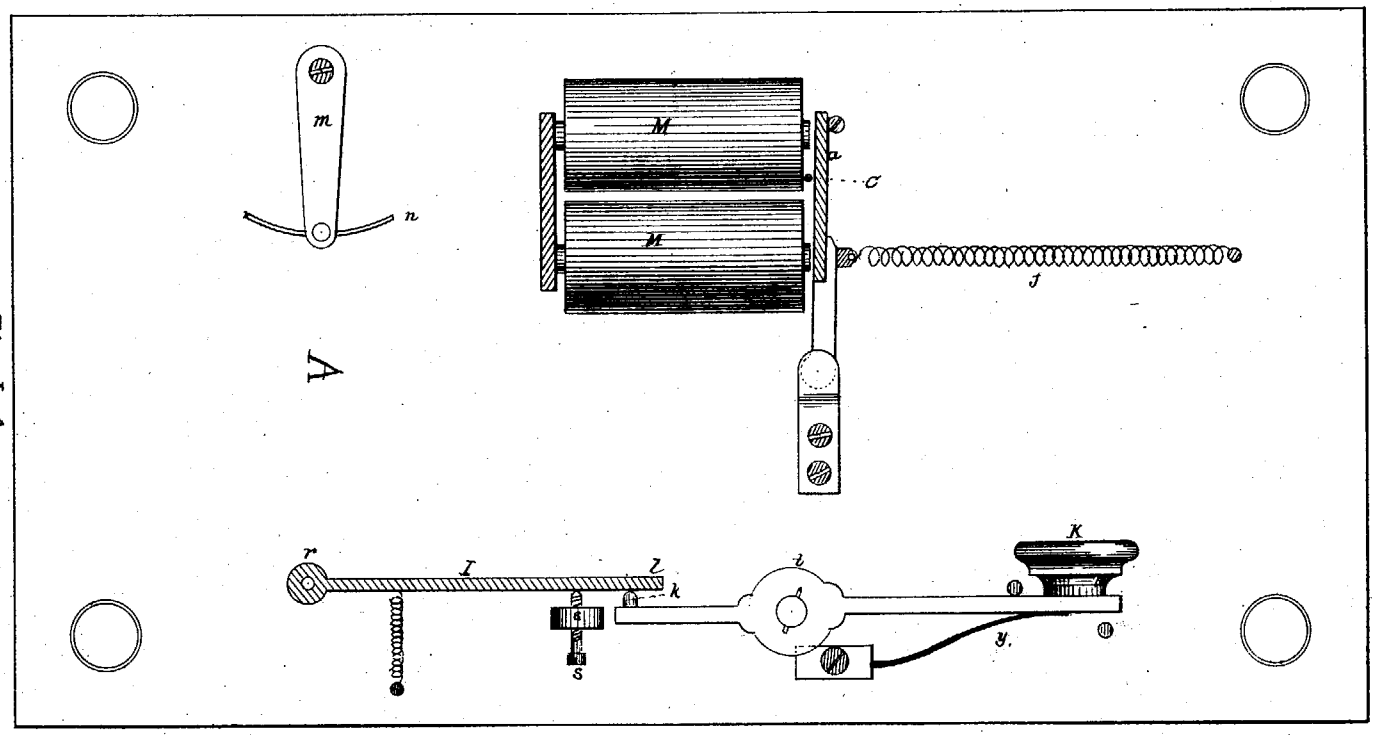
Fig. I. A
Witnesses.
Charles Stowell
Geo A. Stowell
Inventor.
Morris G. Farmer.
THE NORRIS PETERS CO., PHOTO-LITHO., WASHINGTON, D. C.

4 Sheets--Sheet 2.
M. G. FARMER.
Electro-Magnetic Telegraphs.
No. 5,181. Reissued Dec. 10, 1872.
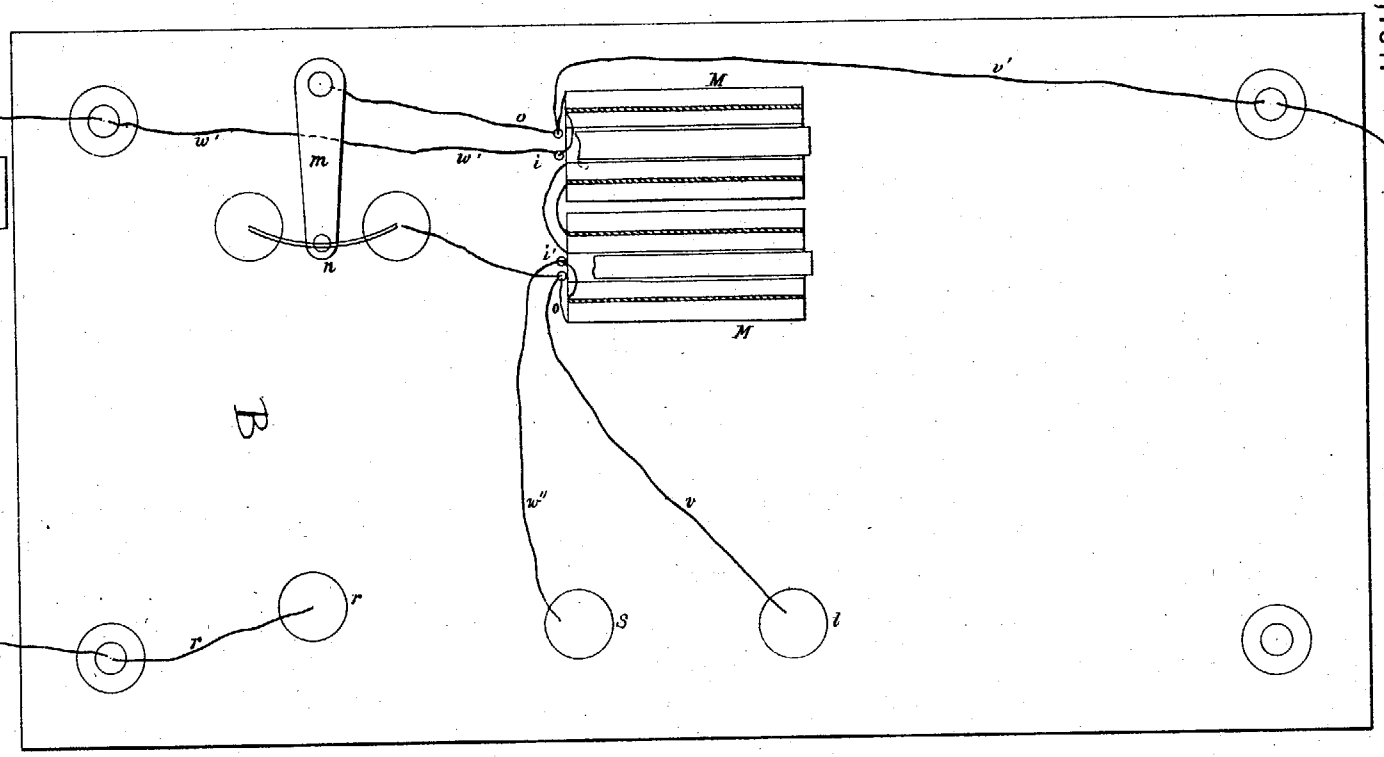
Fig. I. B.
Witnesses.
Charles Stowell.
Geo A. Stowell
Inventor.
Moses G. Farmer.
THE NORRIS PETERS CO., PHOTO-LITHO., WASHINGTON, D. C.

M. G. FARMER.
Electro-Magnetic Telegraphs.
No. 5,181. Reissued Dec. 10, 1872.
*Station C.* *Station D*
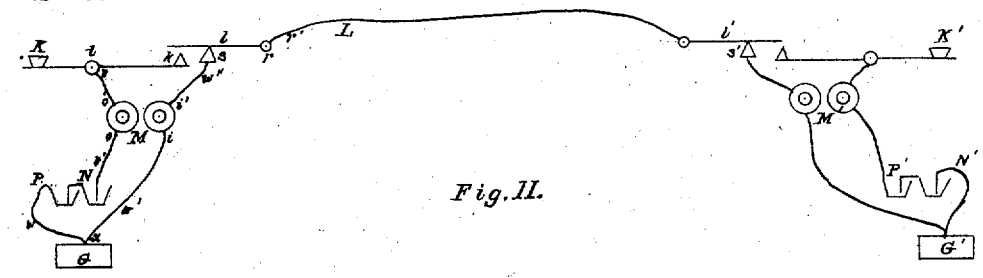
*Fig. II.*
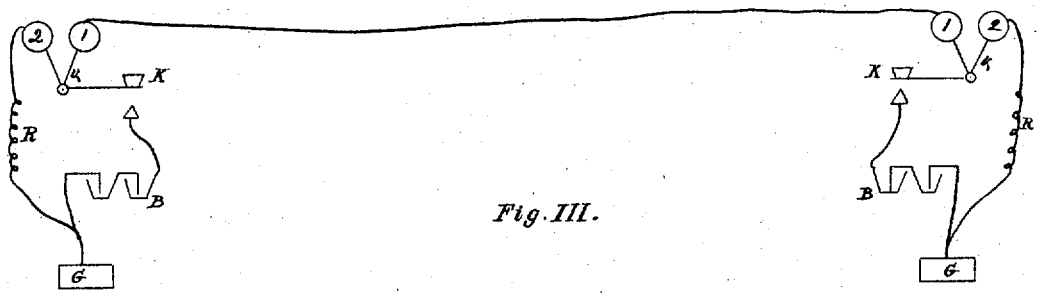
*Fig. III.*
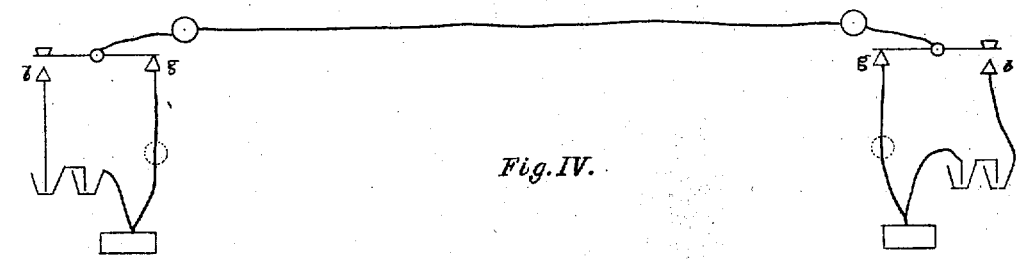
*Fig. IV.*
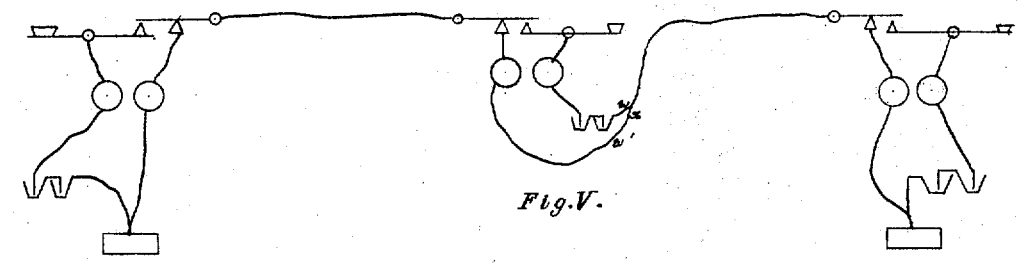
*Fig. V.*
*Witnesses.*
Charles Stowell
Geo A. Stowell
*Inventor*
Moses G. Farmer.
THE NORRIS PETERS CO., PHOTO-LITHO., WASHINGTON, D. C.

M. G. FARMER.
Electro-Magnetic Telegraphs.
No. 5,181. Reissued Dec. 10, 1872.
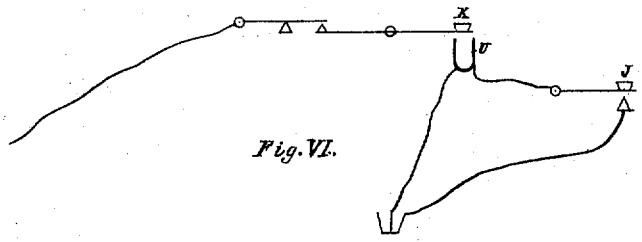
*Fig. VI.*
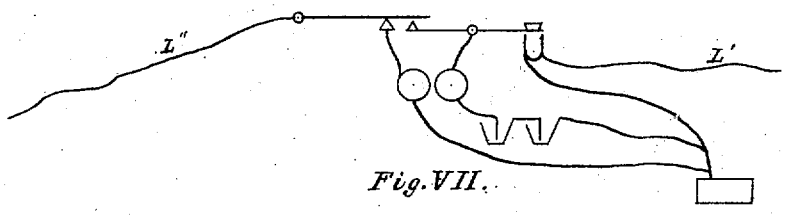
*Fig. VII.*
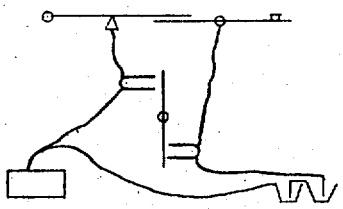
*Fig. VIII.*
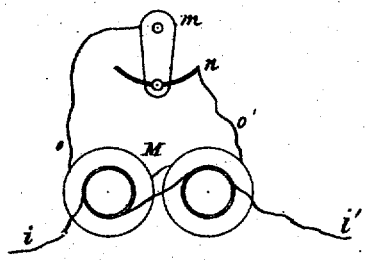
*Fig. IX.*
*Witnesses.*
Charles Powell
Geo A. Stowell
*Inventor.*
Moses G. Farmer
THE NORRIS PETERS CO., PHOTO-LITHO., WASHINGTON, D. C.

UNITED STATES PATENT OFFICE.

MOSES G. FARMER, OF SALEM, MASSACHUSETTS.

IMPROVEMENT IN ELECTRO-MAGNETIC TELEGRAPHS.

Specification forming part of Letters Patent No. 26,097, dated November 15, 1859; reissue No. 5,181, dated December 10, 1872.

*To all whom it may concern:*

Be it known that I, MOSES G. FARMER, of Salem, in the county of Essex and State of Massachusetts, have invented an Improvement in Electric Telegraphs; and I do hereby declare that the following is a full, clear, and exact description of the construction and mode of using the same, reference being had to the accompanying drawing, and to the letters and figures marked thereon.

Figure I, A, is a top view of the apparatus; and Fig. I, B, shows more particularly the connection of the several parts. The other figures are referred to in detail in this specification.

The object of my invention is to enable persons to transmit two dispatches simultaneously over a single wire or single line of telegraph. This I accomplish in the manner herein described.

In an application for a patent which was granted me August 31, 1858, I introduce a transmitting key or device, which had for its objects, first, to preserve the continuity of the main circuit; secondly, to alternately reverse the directions of the current from the main battery at the transmitting-station; and, thirdly, to bring into play a local accessory, or equating-battery. This key or device may with propriety be called "a continuity-preserving key or transmitter." It might also be called a three-point key.

In the invention before us I do not reverse the direction of the current proceeding from the main battery at the transmitting-stations, neither do I make use of an accessory or equating battery; therefore I need to make use of only one of the three contact-points in the key-lever. But I make use of two distinct sets of wires, coils, or helices upon one or more electro-magnets, and so arrange these sets that the current proceeding from the battery at any station shall flow through such an arrangement of the wires or helices of the electro-magnet that this current, alone or unaided, shall not be able to put in motion the armature of the relay at the transmitting-station, but shall be able to put in motion the armature of the relay at the receiving-station, for the reason that it flows through a set of wires or coils at the receiving-station when that station is not transmitting differently arranged from what it does when that station is transmitting; and the arrangement of one set of coils is such that, if both stations simultaneously are sending their battery-currents into the main line, they shall both together be able to move the armature at both stations, even though flowing through the coils or wires of weaker action.

Figure II represents a line of telegraph with the skeleton of an apparatus at each end of it, the same being more definitely represented at A and B, Fig. I. The instrument or apparatus at one end of the line of telegraph is precisely similar to that at the other end, and consists essentially of a galvanic battery, P N, Fig. II; a finger-key or circuit-breaker, K *l s;* an electro-magnet or sounder, M, with the wires necessary to connect the several pieces with each other, and to put them properly in the telegraphic circuit.

I will now describe the construction of the several parts of the apparatus represented in full in Fig. I, and in skeleton in Figs. II and IX. K is the manipula g or finger key, movable around the axis *t*. It differs from those in common use in being so constructed that when it is pressed down it shall make contact with the lever I by means of the stop *k*, and when it is let up it shall allow the lever I to descend and make contact with the stop *s*, and the spring *y* shall press up the key K so far as to break contact between *k* and *l;* after that *l* has rested upon *s*, the lever I is movable about the axis *r*. It is plain that in this construction, by means of the downward motion of the key K the contact *l k* is made before the contact *l s* is broken, and in the upward motion of the key K the contact *l s* is made before the contact *l k* is broken. The electro-magnet or sounder or relay (if a local circuit be used) is constructed as relays ordinarily are, with this exception: the wire composing each helix, instead of being in one continued length, is made in two distinct lengths, insulated from each other—in other words, several layers of insulated wire are wound on a leg of the magnet and the ends of the wire brought through the head; then half as many more layers are wound on the leg, outside of the former layers, and the ends of this wire are brought through the head and left free for the proper connections. It is not necessary that there should be exactly twice as many layers of the inner wire as of the outer, but I prefer that it should be so arranged that the one collection of layers, with a given strength of current, should be capable of exciting twice as much magnetism in the iron as the other collection of layers can do with an equal strength of current. The other leg of the magnet is wound in precisely the same manner, the ends of the wires being brought through the head of the magnet and left free for the proper connections, which are as follows: The inside ends of the inside coils on each leg of the magnet are joined together, also the inside ends of the outside coils are joined together, so there are left projecting from the magnet all four of the outside ends, viz., *o o'*, belonging to the outside coils, and *i i'*, belonging to the inside coils, as seen in Fig. IX. They are now connected as follows: The outside end *o'* of the outside coils is connected by the wire *v* to the axis *t* of the key K; the outside end *o* of the outer coils is connected by wire *v'* to the pole N of the battery P N, the pole P being connected to the ground-plate G by the wire *w*. The outside end *i'* of the inner coils is connected by the wire *w''* to the stop *s* under the lever I. The outside end *i* of the inner coil is connected to the ground-plate directly by the wire *w'*. The part *r* of the lever I is connected by the wire *r'* to the main line L. The pole P of the battery P N in Fig. II is connected to the ground, while the pole N' of the battery P' N' at the other end of the line L is connected to the ground. There may be used, when necessary, a rheostat, connected as shown at *m n*, Fig. IX. One end, as *m*, of the wire of the rheostat may be connected to the end *o* of the wire of the outer helix of the magnet M, while the other end *n* of the wire of the rheostat is connected to the end *o'* of the outer helix of the magnet M. The object of this arrangement is to divert a portion of the current through the rheostat, and not to suffer all the current to flow through the outer helix. This is especially necessary when the two helices (the inner and the outer) are not properly proportioned to each other, and also when from imperfect insulation of the main line of the telegraph a portion of the transmitted current escapes.

I will now describe the operation of the instruments. When the apparatus at each end of the line L is properly connected and in working order there is normally no current on the line, the circuit of the battery being open at the points *k l*. If, now, at station C, Fig. II, the key K be depressed, contact is made between the points *k* and *l*, while at the same time it is broken between *l* and *s*. The current of the battery P N will divide at O, part going through the rheostat *m n* and part going through the outer helix of the magnet M, both branches, however, uniting at O' and flowing thence by wire to the key K at *t*, and thence to the lever *l*; thence by the wire *r'* to the line L; thence to the lever *l'* at station D; thence to the stop *s'*; thence to the inner helix of M'; thence to the ground-plate G', and back, by the ground, to the plate C at station C and to the battery P N.

The effects will be as follows: The current from the battery P N will not be able, flowing through the rheostat *m n* and the outer helix *o o'* of the magnet M, to charge it sufficiently to overcome the tension of the spring *f*, which tends to retract the armature *a* of the magnet M, if the spring is properly adjusted; but this same current, flowing through the inner helix of the magnet M' at station D, will have sufficient strength to overcome its armature-spring, and will produce motion in its armature. This motion will be arrested by the stop *c*, Fig. I, A, and will produce a sound, as is usual in telegraphic relays, which action, being well known and understood, I need not here describe how information is conveyed thereby. If desired, the action of the armature *a* and the stop *c* can bring into action a local circuit and register or other apparatus for recording or indicating intelligence. If, now, while the key K at station C is depressed, the key K' at station D be also depressed, the current from the battery N' P' will be caused to flow through the outer helix of M', the line L, and the battery P N. If the circuit be well insulated the two currents thus united will form one of nearly double strength, and, acting through the outer helices of the magnets M and M', will thus be able to attract and move their armatures against their stops, and both will produce sounds or signs. Now, if either key be let up, as K at station C, the armature *a'* at the other station D will be released, because there is no current of double strength flowing through its outer helix, there being only the current of the battery N' P' flowing through the outer helix of M' and through the inner helix of M, so that only the one armature *a* will be retained attached.

In this manner it is plain that communication can be kept up simultaneously at each end of a line of telegraph, and not only between two terminal stations, but between one terminal station and one way-station, or between two way-stations, if the junction of the wires *w w'* at *x*, instead of being connected to the ground, be connected to the main line, as at *x* in Fig. V.

It is obvious that an electro-magnet, U, can be used to depress the key K, as in Fig. VI, the circuit of which electro-magnet can be closed by means of another circuit-closer, J, situated near to or remote from the circuit-closer K, and thus one line, say L', be able to repeat its intelligence on another line, L'', as in Fig. VII, while at the same time the line L'' is repeating intelligence upon the line L'.

It is obvious that two electro-magnets operating upon one armature-lever might be used, one or both of which could be capable of adjustment at different distances, as in Fig. VIII. It is also obvious that, instead of using superimposed helices, the helix on one leg of the magnet can be used when the key is depressed, and the helix on the other leg of the magnet when the key is let up, as in Fig. II; but I prefer the superimposed helices, because their action does not alter the distribution of magnetism in the iron.

In Fig. III I have represented the rudiments of a previously known plan for transmitting two messages simultaneously. When the key K is depressed the current from the battery B splits or forks at the point U, and half goes through the helix 1 on one leg of the magnet and half through the helix 2 on the other leg of the magnet, the two half currents neutralizing each the effect of the other, the relative strength of the two halves being adjusted by the rheostat R.

Fig. IV shows Cornell's key, which opens the ground-circuit at *g* before it closes the battery-circuit at *b*. My key, on the contrary, closes the battery-circuit before it opens the ground-circuit, as in Fig. II. I think it preferable to use a magnet with superimposed coils, as in Figs. I and IX, and care should be taken that the current should circulate in the same direction in the inner helix as in the outer one; otherwise the magnet will be obliged to lose all its polarity, and acquire the opposite polarity whenever the circuit changes from the inner helix to the outer one, and this would cause an extra stroke of the armature, and though it would be only instantaneous yet it would amount to an extra dot if used for a "dot-and-line" alphabet.

I am aware that it is not new to use an electro-magnet with two sets of helices wound upon it, nor yet two electro-magnets working upon the same armature-lever; but I believe it to be new to combine a continuity-preserving key, as above described, with an electro-magnet having two sets of wires or helices coiled upon it, or with two sets of electro-magnets acting upon a single armature-lever; and new to combine a transmitting device, as above described, with one or more sets of electro-magnets to operate upon one and the same armature-lever, and having two distinct sets of wires or helices, as above described, to operate with greater or less force on the cores as occasion requires; also new to repeat from any main circuit to another with simultaneous double transmissions; likewise new for a way-station, without a ground-plate at that station, to hold simultaneous communication with another station, either way or terminal. It is new, also, as I believe, to shunt part of the main current around a receiving instrument, thus modifying the force of current in the receiver; and new to work the key or circuit-closer of a double transmitter by means of an independent local or main circuit having a finger-key or other circuit-closer embraced in it, substantially as in Figs. VI and VII.

The device which closes a previously-open branch of a circuit at the same time, or slightly before it opens another path or branch previously closed, being called "a circuit-preserving key"—

I claim as my invention, and desire to secure by Letters Patent—

1. The combination of a circuit-preserving key with an electro-magnet having two coiled wires on each limb of the electro-magnet, or with two electro-magnets to operate upon one and the same armature-lever.

2. In an instrument for double transmission, the combination of an electro-magnet, or its equivalent, with the continuity-preserving key when the arrangement is such that said key can be operated by an independent circuit, either main or local, which has included in it either a finger-key or any other well-known circuit-closing device for operating it, substantially as represented in Figs. I, VI, and VII of the drawing.

3. The combination of a rheostat or adjustable shunt with a receiving instrument, so arranged that any desired portion of the current upon the main-line wire can be allowed to pass through the receiving instrument.

4. The combination of a circuit-preserving key with an electro-magnet having two wires coiled upon each of its limbs, and with a rheostat or other well-known device for regulating the amount of current which shall flow through one of the coils.

MOSES G. FARMER.

Witnesses:

CHARLES STOWELL,
GEO. A. STOWELL.